(12) United States Patent
Thomas et al.

(10) Patent No.: US 9,576,261 B2
(45) Date of Patent: Feb. 21, 2017

(54) QUICK DRAFTS OF ITEMS IN A PRIMARY WORK QUEUE

(71) Applicant: Microsoft Corporation, Redmond, WA (US)

(72) Inventors: Teresa Thomas, Seattle, WA (US); Matthias Baer, Seattle, WA (US); Hiroshi Tsukahara, Bellevue, WA (US); Marcos David Marin Amador, Seattle, WA (US); Tony Liang, Seattle, WA (US); Benjamin Franklin Carter, Redmond, WA (US); Matthew Wood, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 132 days.

(21) Appl. No.: 14/255,627

(22) Filed: Apr. 17, 2014

(65) Prior Publication Data

US 2015/0302334 A1  Oct. 22, 2015

(51) Int. Cl.
*G06F 7/00* (2006.01)
*G06F 17/30* (2006.01)
*G06Q 10/06* (2012.01)
*G06F 3/0484* (2013.01)
(Continued)

(52) U.S. Cl.
CPC ....... *G06Q 10/06316* (2013.01); *G06F 3/0484* (2013.01); *G06Q 10/107* (2013.01); *H04L 51/04* (2013.01)

(58) Field of Classification Search
CPC ... G06F 17/30; G06F 17/30241; G06F 21/604
See application file for complete search history.

(56) References Cited

U.S. PATENT DOCUMENTS

2007/0250576 A1* 10/2007 Kumar ................. G06Q 10/107
                                                              709/206
2008/0162114 A1*  7/2008 Torres-Rocca ...... G06F 17/2836
                                                              704/7
(Continued)

FOREIGN PATENT DOCUMENTS

GB           2414088 A      11/2005

OTHER PUBLICATIONS

"International Search Report & Written Opinion Received for PCT Patent Application No. PCT/US2015/024421", Mailed Date: Jun. 18, 2015, 8 Pages.
(Continued)

*Primary Examiner* — Tuan A Pham
(74) *Attorney, Agent, or Firm* — Anand Gupta; Tom Wong; Micky Minhas

(57) ABSTRACT

Techniques disclosed herein facilitate the use of the primary work queue within an information management application as a centralized access point for creating and viewing multiple types of new draft items such as a note, to-do, or message item. An information management application can receive a new item request through its user interface and initiate a new draft item in response to the new item request. A view of new draft item can then be surfaced in a primary work queue of the information management application. The item type of the new draft item may be different than other item types in the primary work queue.

16 Claims, 15 Drawing Sheets

(51) Int. Cl.
*H04L 12/58* (2006.01)
*G06Q 10/10* (2012.01)

(56) References Cited

U.S. PATENT DOCUMENTS

| | | | | |
|---|---|---|---|---|
| 2009/0182824 | A1* | 7/2009 | Haynes | H04L 51/18 |
| | | | | 709/206 |
| 2010/0100370 | A1* | 4/2010 | Khouri | H04L 12/58 |
| | | | | 704/9 |
| 2010/0179833 | A1* | 7/2010 | Roizen | G06Q 50/10 |
| | | | | 705/3 |
| 2011/0010635 | A1 | 1/2011 | Fox et al. | |
| 2013/0097526 | A1* | 4/2013 | Stovicek | G06Q 10/107 |
| | | | | 715/752 |

OTHER PUBLICATIONS

"Tutorial Greek: Use Gmail as a GTD Tool (Getting Things Done and using Gmail More Productively)"—Dec. 16, 2012 Retrieved on: Jun. 11, 2015 Available at: http://www.tutorialgeek.net/2012/05/use-gmail-as-gtd-tool-getting-things.html.

Darren, "Outlook 2013—Better Visibility of Draft Messages", Published on: Aug. 20, 2012, Available at: http://www.dadams.co.uk/2012/08/20/outlook-2013-better-visibility-of-draft-messages/.

"Quicker Replies in the New Microsoft Outlook 2013", Published on: Apr. 2013, Available at: http://www.ancsite.com/quicker-replies-microsoft-outlook-2013.

Porter, Suzannah, "Web Worker's Firefox Extensions", Published on: Mar. 3, 2008, Available at: https://www.diigo.com/list/suzannah/firefox.

"Draft Notify", Published on: Mar. 12, 2013, Available at: http://wordpress.org/plugins/draft-notify/.

"Second Written Opinion Issued in PCT Application No. PCT/US2015/024421", Mailed Date: Feb. 25, 2016, 5 Pages.

"International Preliminary Report on Patentability Issued in PCT Application No. PCT/US2015/024421", Mailed Date: Jul. 4, 2016, 6 Pages.

* cited by examiner

QUICK DRAFTS OF ITEMS IN A PRIMARY WORK QUEUE

BACKGROUND

As modern work has become increasingly computer-based, users have had to integrate electronic messaging into their daily workflow. In fact, electronic messaging is so important to both home and work environments today that people sometimes use electronic messaging functionality as a central point for managing tasks. In some cases, users may "draft a message" to remind themselves to perform a particular task or to take note of an idea. The draft message function thus takes on the role of to-do list management for many users.

However, in some electronic messaging applications, draft messages are displayed in a separate list or folder from a main view or list of messages. In addition, there may be inconsistencies across devices in how drafts are displayed. When draft messages are in a separate list or folder, the user has to navigate to this additional list to view the draft and retrieve the reminder to perform a task. One work-around for the separate draft message lists is for a user to address and send the draft message to herself so that the message appears in their inbox, or main message list. However, this requires a network connection so that the messaging client can send and receive the message. Even in messaging applications with "to-do" list functionality, the to-do items may be presented in their own list, separate from the message list, such that users' task management workflow is not centralized.

BRIEF SUMMARY

Techniques are disclosed for simplifying the creation of new draft items and integrating the presentation of the items within an information management application's primary work queue. Techniques disclosed herein facilitate the use of the primary work queue within an information management application as a centralized access point for creating and viewing multiple types of new draft items.

Implementations described herein enable a user to quickly create notes, to-dos, reminders, calendar notations, and other items concerning pending tasks within an information management application. The quickly created items are available within the information management application's primary work queue in concert with emails, messages, notifications, and other pending work. The techniques enable a seamless workflow spanning across incoming messages and self-assigned tasks.

In some implementations, the entry point to creating a quick draft of an item may be a single step where an input of typing, gesturing, or speaking from within an information management application may initiate a new draft item user interface from which draft content may be input. In some cases, a menu command may be used instead of or in addition to the input initiating the creation of a draft item. In some cases, any information management application item being created or modified by a user may default as a quick draft unless and/or until the draft is saved as a particular item or sent as a message.

In some implementations, the item type of new draft item may be determined by the application. Based on the item type of the new draft item, the view of the new draft item presented in the primary work queue may have an item-type view with item-specific features or functionality; item-related interface functionality, item context functions, and triage gestures that specifically relate to the new draft item type may be provided. The item type may be changed or specifically selected by the user at any time and the item-type view with item-specific features or functionality adjusted by the application accordingly.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1A:
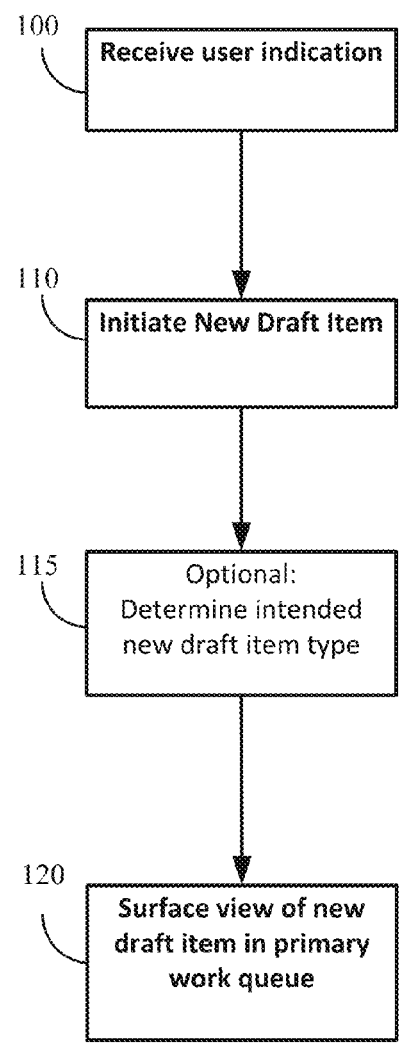
FIGS. 1A and 1B show functional and graphical diagrams, respectively, for implementing a quick draft in a primary work queue of an information management application.

Techniques are disclosed for simplifying the creation of new draft items and integrating the presentation of the items within an information management application's primary work queue. Techniques disclosed herein facilitate the use of the primary work queue within an information management application as a centralized access point for creating and viewing multiple types of new draft items.

An information management application refers to an application that functions as an electronic organizer and manager of information deemed of value to a user, such as collections of various forms of content (documents, music, images, and the like), calendars, task lists, and contacts. Information management applications often incorporate email and other electronic messaging services. An "electronic messaging application," "email client," or "email application" refers to a program that enables a user to access the user's email or other electronic messaging services. An information management application may be a local application running on the user's computing device (e.g., a desktop computer, mobile device) or a web application accessed by the user via a browser running on the user's computing device.

Examples of desktop information management applications that may implement the techniques and features herein include, but are not limited to, Microsoft Outlook®, IBM Lotus Notes®, and Apple® Mail. Examples of mobile email information management applications that may implement the techniques and features herein include, but are not limited to, the Gmail® App for Android™, MailDroid™, and TouchDown™.

Some information management applications may depend on web or cloud-based services and, as such, are accessible through a web browser. Examples of browser-based clients are Google Gmail®, Outlook.com, Microsoft's Outlook Web Access (OWA) for accessing Microsoft Exchange corporate email and information management services over a web browser, and Yahoo!® Mail. In some cases, a native information management application can be available. Examples of such information management applications include Trello® from Fog Creek Software and Asana® from Asana Inc.

Although email applications are predominantly described herein for implementing a new draft item capability, other messaging services and modalities may also implement the described techniques and features. Thus, embodiments may be implemented in a variety of information management applications.

Included in the notion of an information management application are applications that include services that are not traditional forms of electronic messaging. One category of a non-traditional information management application can include social media applications. For example, the Facebook® social media service includes views of an account-holder's new messages from friends, acquaintances, and advertisers. Facebook® also includes news views and various "home page" views of the user's posted content. Facebook's web browser application allows varying forms of presentation of these messages, news, and home views. Mobile device clients (such as the Facebook App or Facebook Paper) may show additional views of the same information provided from the Facebook service.

Another information management application is a "news reader." A news reader is an application that may be installed on a desktop, mobile, or other device for reading news stories gathered by an aggregating news feed service. A user might subscribe to such a service based on an interest in various categories of news topics, and then utilize one of a variety of news reader applications to review, filter, sort, and manage the views of daily news to which he or she subscribes. News reader applications may run in a web browser, such as Feedly™, or may run locally on a mobile device client. Examples of mobile news readers are Feedly™ for Android, Reeder for iOS, and gReader for Android, and Facebook Paper™.

Other aggregator/personal assistant applications and services such as Google Now™ available from Google Inc., Siri® available from Apple Inc., and Cortana® available from Microsoft Corp., which pull information from news sites and local (client) information, may be considered information management applications for incorporating the techniques described herein.

A point of commonality between each of these information management applications—whether they are traditional email clients, social media applications, news reader applications, or other application categories—is that they each have a notion of a "primary work queue" or primary view of the world.

A primary work queue in an information management application is a centralized location where the user may go to see notifications, messages, news, to-dos, notes, or other pending work that has been delegated to the user or that is self-assigned. A user may also take action on the items from the primary work queue. Some information management applications may have more than one primary work queue, the selection of which depends on user preference or other criteria.

In an email application like Gmail, the primary work queue is the inbox. In a social media application like Facebook, the primary work queue may be the notifications view, news feed view, or the messages view (depending on user utilization and configuration). In a news reader like Feedly™, the primary work queue may be the "home" view, which shows a sampling of the most recent news items in each of the subscribed news categories.

The term "draft item" as used herein includes any message or content type that may be found within an information management application. Many item types may be present in an information management application. For example, item types may include messages, to-do list items, calendar items, contacts, reminders, and even customizable types. In a social media application providing the information management application, an item type may include a message from a friend, an advertisement, a news item, and a photo posting. In a news reader application providing the information management application, an item type includes news items. A new draft item may be referred to herein in various ways, including "draft item", "item", and "new item." Here, a draft item is expected to be initiated by the user and not received from an outside source. However, the availability of the new draft item to be viewed by someone other than the user is not precluded.

Implementations described herein enable a user to quickly create notes, to-dos, reminders, calendar notifications, and other items concerning pending tasks within an information management application. The quickly created items are available within the information management application's primary work queue in concert with emails, messages, notifications, and other pending work. The techniques enable a seamless workflow spanning across incoming messages and self-assigned tasks.

In some implementations, the type of new draft item may be determined based on natural language processing of initial command words or of the text that forms the content of the new draft item.

For example, a new draft item with the content "meet with Jenny on Thursday at 10" can cause a calendar item to be created in some implementations. "File taxes by April 15" can create a to-do item with an attached reminder in some implementations. Combination items are even envisioned, for example "Complete the sales report for meeting with Jenny on Thursday" can spawn both a to-do item (for the sales report) and a calendar item type (for the meeting time). The calendar item and to-do item generated in this manner can be available in the primary work queue or provided in one form in the primary work queue and in a more traditional form in a corresponding calendar and task list portion of the application. Where multiple forms of the item are provided, the two forms can be synchronized so that updating one can automatically update the other.

In some implementations, techniques enable the addition of item-related interface functionality, item context functions, and triage gestures that specifically relate to the new draft item type. In some implementations, available commands and menus for the items in the primary work queue may be dependent on item type; thus, a determination of item type for a new draft item can affect the available commands by which the draft item may be acted upon. For example, triage gestures may allow the user to use a "swiping" finger motion to mark a to-do list item as completed.

In some implementations, the view of the new draft item presented in the primary work queue may include item-specific features (which may be referred to herein as an "item-type view"). For example, if a new draft item type is determined to be a "to do" list item, the view of the item in the primary work queue may contain a checkbox so that the user may quickly mark the item completed.

In some implementations, additional, enhanced, and/or modified views of content of a new draft item may be generated. For example, a user may enter content for a draft item without specifying a title or subject and the subject or title of the item in the view for the draft item may be automatically generated from the first line of text in the content area or from an analysis of the content.

Figure 1B:
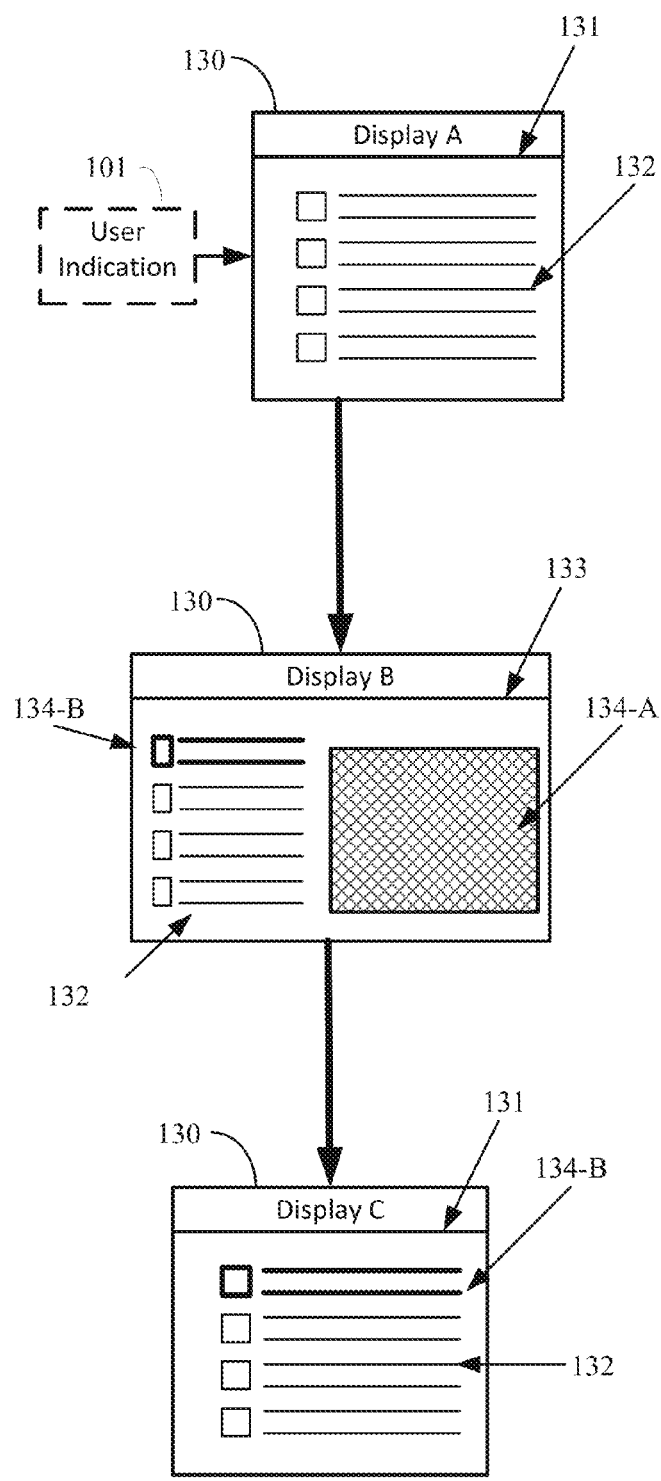

FIGS. 1A and 1B show functional and graphical diagrams, respectively, for implementing a quick draft in a primary work queue of an information management application. The user interface element(s) of an information management application can be presented to the user in a variety of ways depending on the particular implementation.

In FIG. 1A, a process flow for implementing a quick draft in a primary work queue may begin upon receipt of a user's indication of an intent to initiate a new draft item in a primary work queue of an information management application (100). Turning briefly to FIG. 1B, in a first state, Display A, which may be embodied as a device 130 such as described with respect to FIG. 6, instantiates information management application 131. Primary work queue is depicted by element 132. A user may interact with and perform a number of tasks, including implementing a quick draft, within the user interface of the information management application 131. Accordingly, to enter the process flow for the quick draft as described herein, the information management application 131 receives a user indication 101 specific to initiating a new draft item (see operation 100 of FIG. 1A). The user indication 101 can be via a user interface system such as described with respect to FIG. 6.

In some implementations, the entry point to creating a quick draft of an item may be a single step where an input of typing, gesturing, or speaking from within an information management application may initiate a new draft item user interface from which draft content may be input. In some cases, a menu command (e.g., a "new item" command) may be used to initiate the creation of a draft item. In some cases, the input of typing, gesturing, or speaking from within an information management application may initiate any number of actions and a menu may be presented so that a user can select to initiate the creation of a draft item from the input as opposed to another action such as a search. In some cases, any information management application item being created or modified by a user may default as a quick draft unless and/or until the draft is saved as a particular item or sent as a message (or otherwise saved or committed).

Any number of kinds of indication gestures, including clicking a button with a mouse or pressing the button on a touch-screen device may be used to initiate a quick draft in the primary work queue. In some cases, the indication gesture may be merely starting to type on the keyboard and allowing natural language interpretation components to decide the intended action. For example, a user may start typing "remember the milk" and the application may be able to determine that a task or to-do item is desired by the user. In some cases, the typing may be a particular key-code combination including a command sequence. For example, a command sequence of Ctrl-t-d may indicate that a to-do item is being drafted. Another kind of indication using a keyboard may be prefacing the typed text with indicator language such as "todo:" which then prompts the system to launch a new draft item window. The indicator language then may be removed by the system when the new item is created or used as a title for the content following the indicator language.

In some cases, a new draft item indication may be a paste command or gesture indicating the pasting of text from a previously copied selection of text. The user indication may also include selection or highlighting of content from within the messaging application, the information management application as a whole, or even from applications separate from the information management application (e.g., content form a website rendered in a web browser, content from a word processing application or reader application, and the like).

New draft item indications may also include non-touch and non-typing user input such as voice commands. Voice commands may be interpreted by a speech and natural language processor to determine the intent to create a new draft item. Simple voice commands such as "To-do" may indicate to the system the beginning of a new draft item. For example the user may speak "to-do," and in response the system launches a new draft item, processes the spoken language, and inputs the spoken text (or content specified in a spoken command) into the new draft item that is then displayed in the application's primary work queue. Speech commands may be used to insert files or create content so that text, images, and other content may be part of a new draft item.

User indication relevant to wearable devices may even indicate the new draft item is to be created. For instance, if the user utilizes a device which is capable of detecting eye movements, the device might detect that the user's eye gestures toward or lingers on a command area, indicating the user's interest in initiating a new draft item.

It should be emphasized that these examples are for illustrative purposes only and are not intended to limit the possible ways of indicating a new draft item. Some of the different methods of indication are depicted in usage scenarios described later.

Returning to FIG. 1A, once the indication of intent is received (and in some cases detected), the information management application may initiate a new draft item (110). The initiation of a new draft item may include providing a graphical user interface for composing a new draft item. For example, as illustrated in FIG. 1B, in response to receiving a user indication (100), the information management application in Display A initiates an interface transition to Display B, allowing entry of the new draft item content as described above. The new draft item entry state transforms the information management application into view 133, where a new draft item composition interface 134-A has surfaced so the user may enter content.

Returning again to FIG. 1A, as an optional processing step, information management application may automatically or semi-automatically determine the intended new draft item type (115). The item type of the new draft item may be determined directly or indirectly. For example, in some implementations, a menu may be provided so that a user can select a particular item type for the new draft item. In some implementations, the information management application analyzes the content and/or metadata associated with the new draft item to determine the particular item type for the new draft item. In some cases, certain metadata can be generated for the new draft item based on the content. For example, a subject line or the due date of an action item may be determined from the content and this metadata populated automatically by the information management application. Of course, it should be noted that the subject line is not required to be automatically populated and in some cases, simply a preview of some or all of the content of the new draft item may be displayed.

During (as the user enters content or at periodic intervals similar to an automatic save of content) or after the time the user enters content into the new draft item composition interface, the information management application implementing disclosed techniques may surface a view of the new draft item in the primary work queue (120).

For example, as shown in FIG. 1B, the primary work queue 132 may still be visible in the display while the new draft item composition interface 134-A is presented. In some cases, the location of the primary work queue in the display may change, for example by being shifted to the left-hand side. Of course other arrangements are envisioned that allow, for some implementations, at least part of the primary work queue 132 to be viewed while the user enters content in a composition interface 134-A. In the example illustrated in FIG. 1B, as the user enters content via the composition interface 134-A, a view of the new draft item 134-B can surface in the primary work queue 132. It should be understood that the new draft item composition interface may vary widely between different devices and different information management applications and that the examples and capabilities provided herein are merely for illustration.

Completing the entry of the new draft item can transform the information management application interface back to view 131 as shown in Display C. Final disposition of the new draft item 134-B has placed it at the top of the primary work queue 132. In some embodiments the new draft item view that is surfaced in the primary work queue may be a summary view that contains all of, a part of, summarized, truncated, or modified information from that entered in the content are by the user.

In some implementations, the information management application may enable the new draft item indication and presentation within the primary work queue to take place in an "offline" mode where the application is not connected to an underlying information service. For example, practically all mobile applications and some web-browser-based information management applications have local storage for offline modes of operation. By taking advantage of the offline capabilities of some information management applications, the proposed techniques enable local entry, storage, and presentation of the new draft item without requiring network connectivity. The proposed techniques thus represent a distinct advantage over traditional usage patterns that involve the user sending himself or herself an email message in order to show the message in the inbox.

EXAMPLE SCENARIOS

Several example scenarios are now presented in which techniques described herein are implemented on a touchscreen device such as a tablet, smartphone, or desktop device with touchscreen capability. The various scenario examples depict different embodiments of entry points to initiate a new draft item and determination of item types. It should be noted that, while example scenarios depict touchscreen devices, other types of devices covering a wide range of operating environments that implement a variety of information management applications may incorporate or utilize disclosed techniques. The depiction of a touchscreen device in the scenarios below is not intended to be limiting. Furthermore, the particular arrangement of elements and their appearance are merely intended to illustrate how the techniques may be represented in a user interface and should not be construed as limiting the manner that the described techniques are implemented.

Figure 2A:
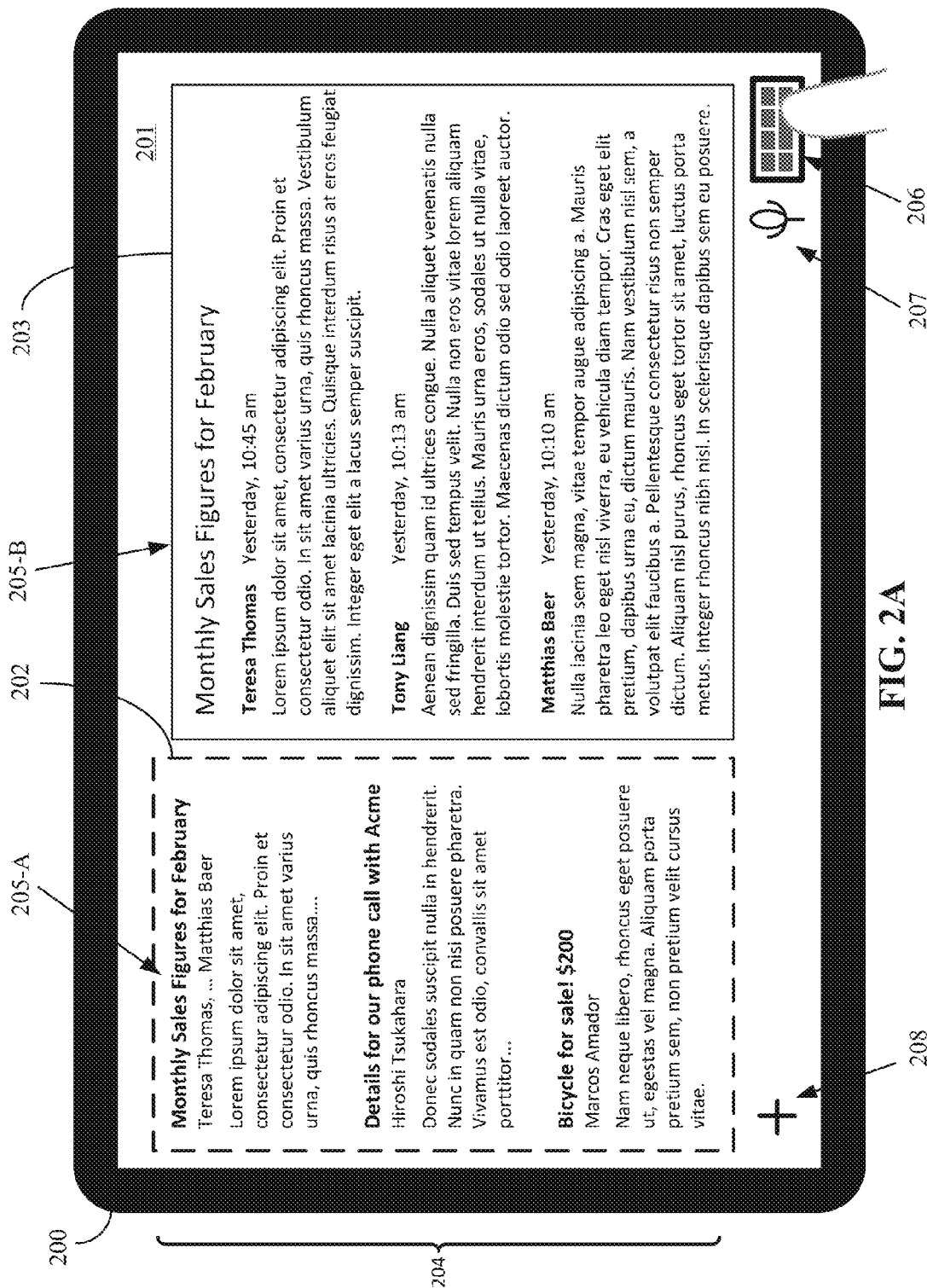
FIGS. 2A-2C illustrate an example scenario of an entry point to initiating a new draft item in an information management application involving an email application.
Figure 2B:
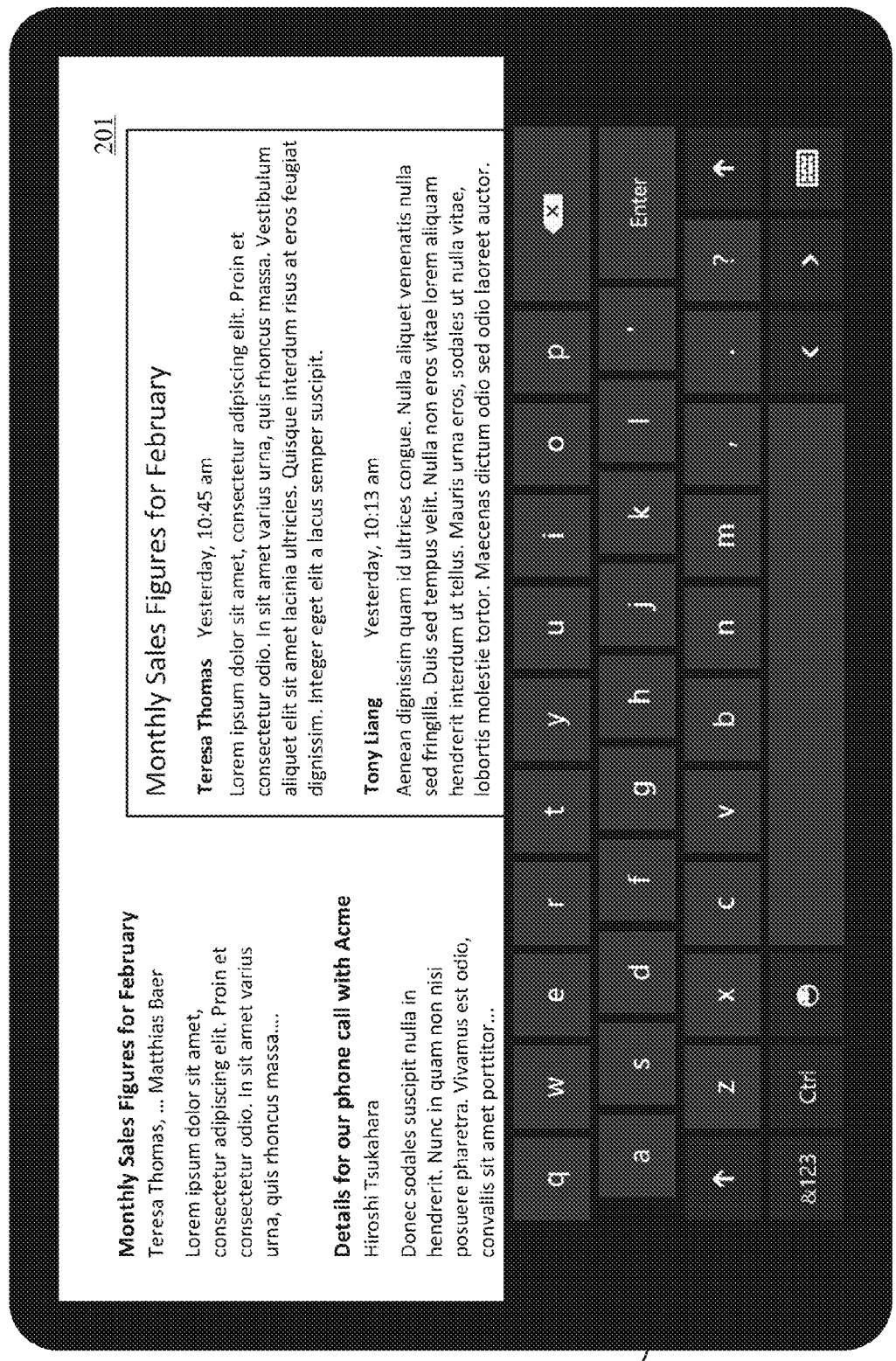
Figure 2C:
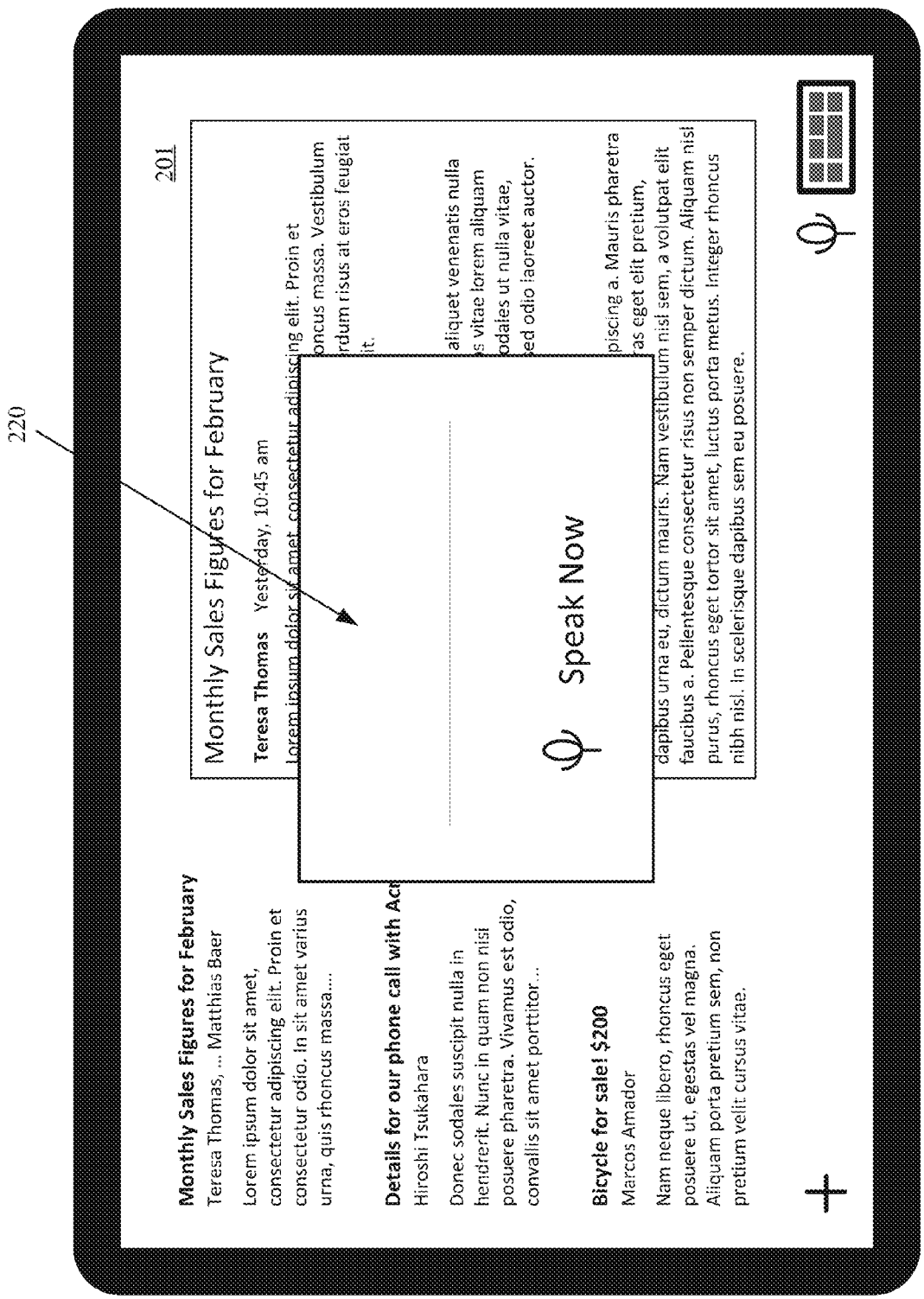

FIGS. 2A-2C illustrate an example scenario of an entry point to initiating a new draft item in an information management application involving an email application.

FIG. 2A shows an initial view of an email application's primary work queue ready to receive an indication of a new draft item.

In FIG. 2A, tablet device 200 shows a view of an email application's inbox 201 having, on the left side, a list view 202 of messages and other items (user-generated and user-received); and, on the right side, an area for previewing or viewing an expanded view 203 of a message or other item from the list of messages and other items 204. In the figure, the first message thread 205-A in the list 204 is shown in the expanded view 203 as a viewable portion of the string of individual messages and replies 205-B forming the selected message thread 205-A.

In the example shown in FIG. 2A, an icon is used to indicate that an input to the information management application is to be received. Here, two touch selection areas 206, 207 are shown that may be relevant to a touchscreen computing device, a touchscreen keyboard input icon 206 and a voice command input icon 207. From the initial state shown in FIG. 2A, the email application may be agnostic as to which indication will be used to prompt the new draft item, as well as agnostic as to which type of new draft item will ultimately be created.

Illustrated, but not yet described is element 208, which represents an expansion command that may surface additional commands that can be carried out with respect to the email application's inbox 201 and/or the email application itself.

By using a fingertip or stylus to select the touchscreen keyboard input icon 206, the system initiates the touchscreen keyboard input interface.

FIG. 2B shows the inbox view 201 having an overlaid touchscreen keyboard 210. When a user touches a key on the touchscreen keyboard, the system may recognize the indication to begin a new draft item, prompting the interface to transition to a new draft item entry interface. In some implementations, the key that is pressed to indicate the initiation of a new draft item may be a particular single key or key combination or keyboard shortcut. For example, an application may interpret an input of the letter "N" as an indicator to begin a new draft item. In some implementations, the application implementing the proposed techniques may interpret any input from a keyboard while the application is in the inbox view 201 as indicating the initiation of a new draft item. Thus, the user may simply start typing the text of the new draft item and the application will launch a new draft item composition interface (e.g., 134-A of FIG. 1B) and insert the typed text.

Returning to FIG. 2A, as another option, by using a fingertip or stylus to select the voice command input mechanism 207, the user may prompt the system to initiate a voice command input interface. It should be noted that, in some implementations, selecting the voice command input mechanism may not require a touchscreen indication, for example where the voice command input interface is prompted by speaking a command phrase of some kind, such as "computer, listen."

FIG. 2C shows the inbox view 201 having an overlaid voice command input interface 220. In FIG. 2C, an overlay of a voice command input interface 220 may surface to communicate to a user that the system is ready to capture and interpret spoken commands or language using speech-to-text or natural language processing facilities. In similar manner to how the system may interpret input from a keyboard as described with respect to FIG. 2B, voice command input interface 220 may allow the user to speak a command that launches a quick draft. For example, receipt of a voice command, "new item," may initiate a new draft item. Speech that is received following the voice command can be applied as content of the new draft item. In some implementations, the voice command input interface 220 may be configured to interpret spoken words such that any spoken words will initiate a new draft item. The spoken words themselves may initiate the new draft item interface and the text of the spoken words, after speech-to-text processing, may be inserted as the content the new draft item.

Figure 3A:
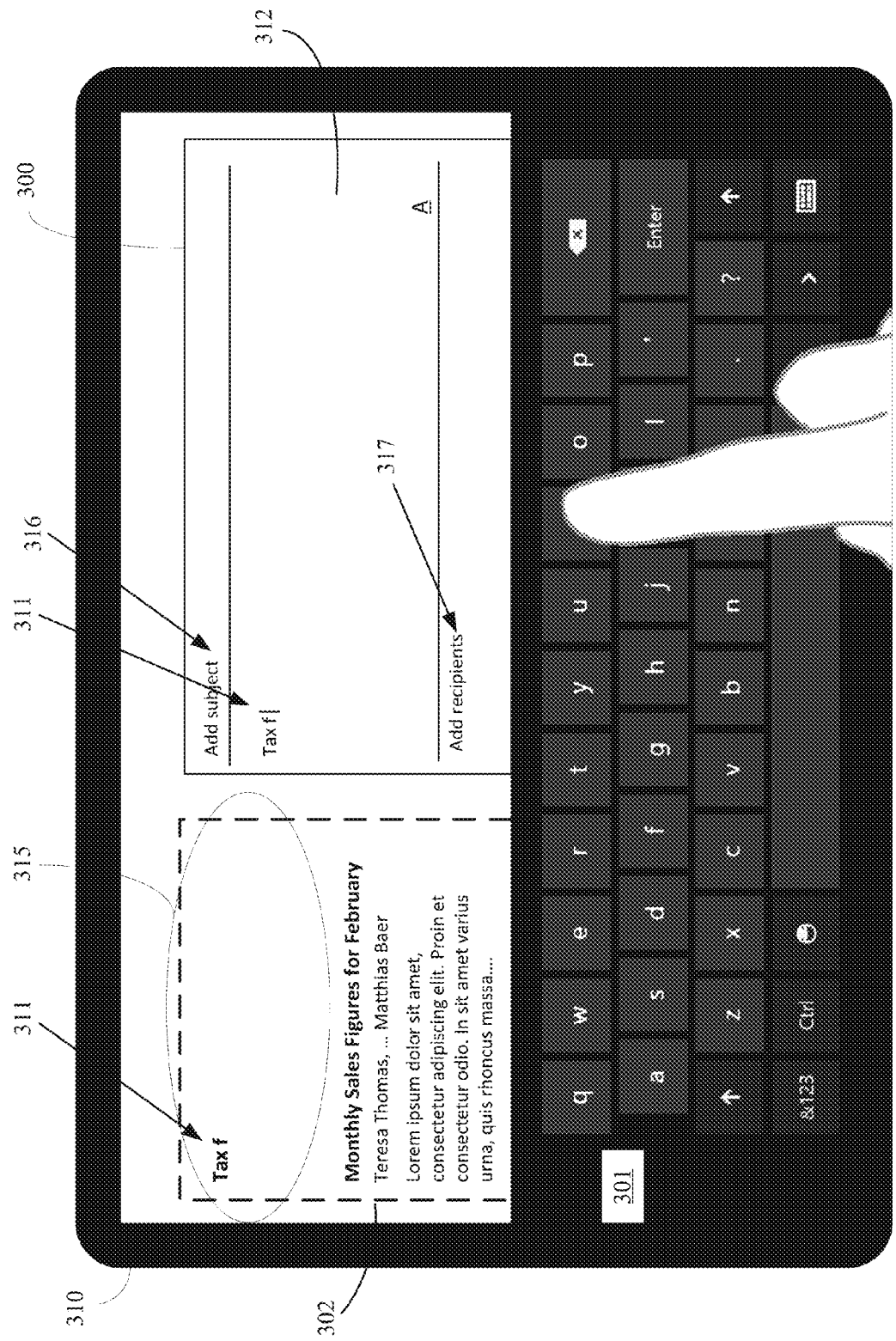
FIGS. 3A-3C illustrate an example scenario of generating a draft item in an information management application involving an email application.
Figure 3B:
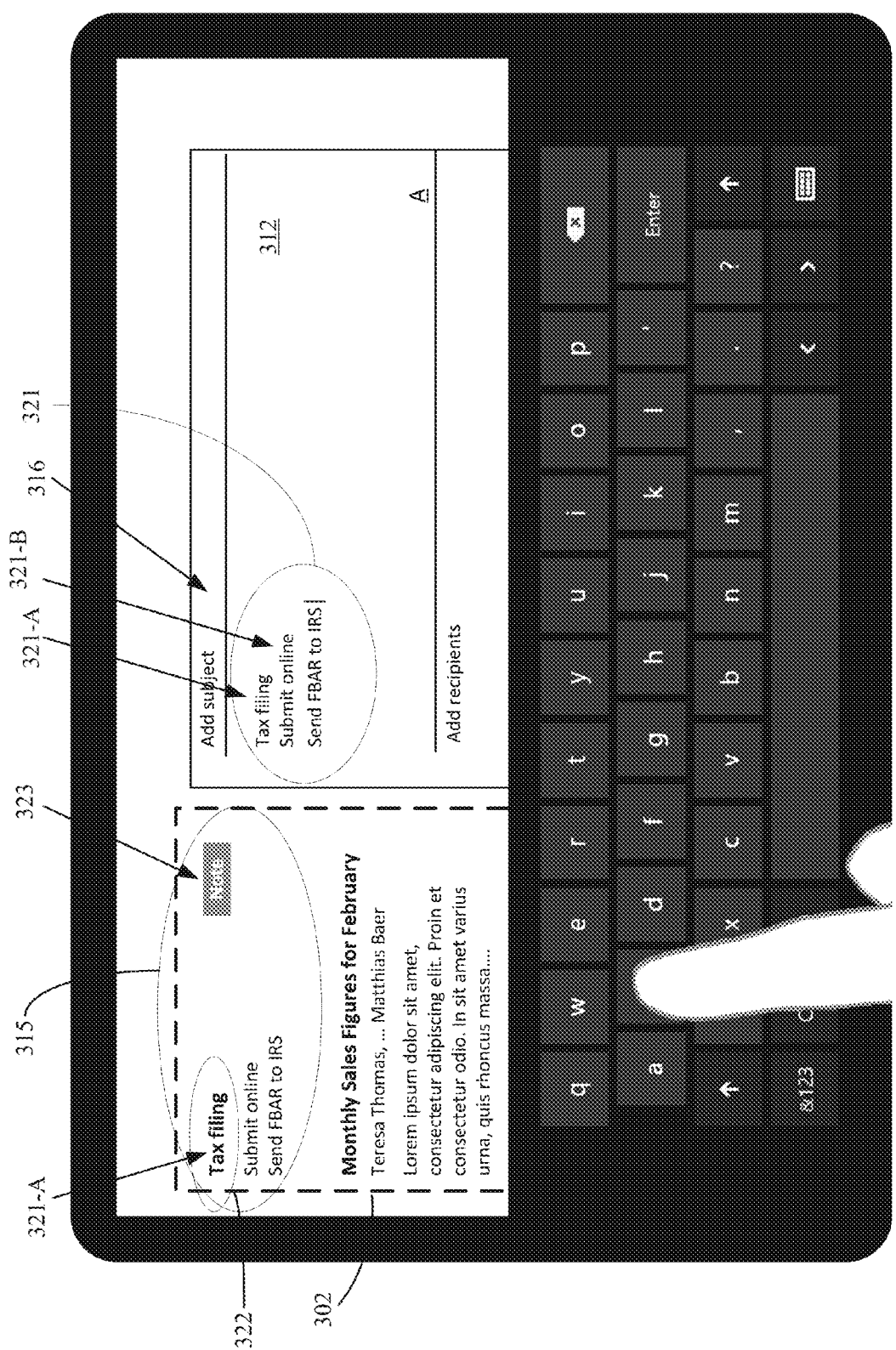
Figure 3C:
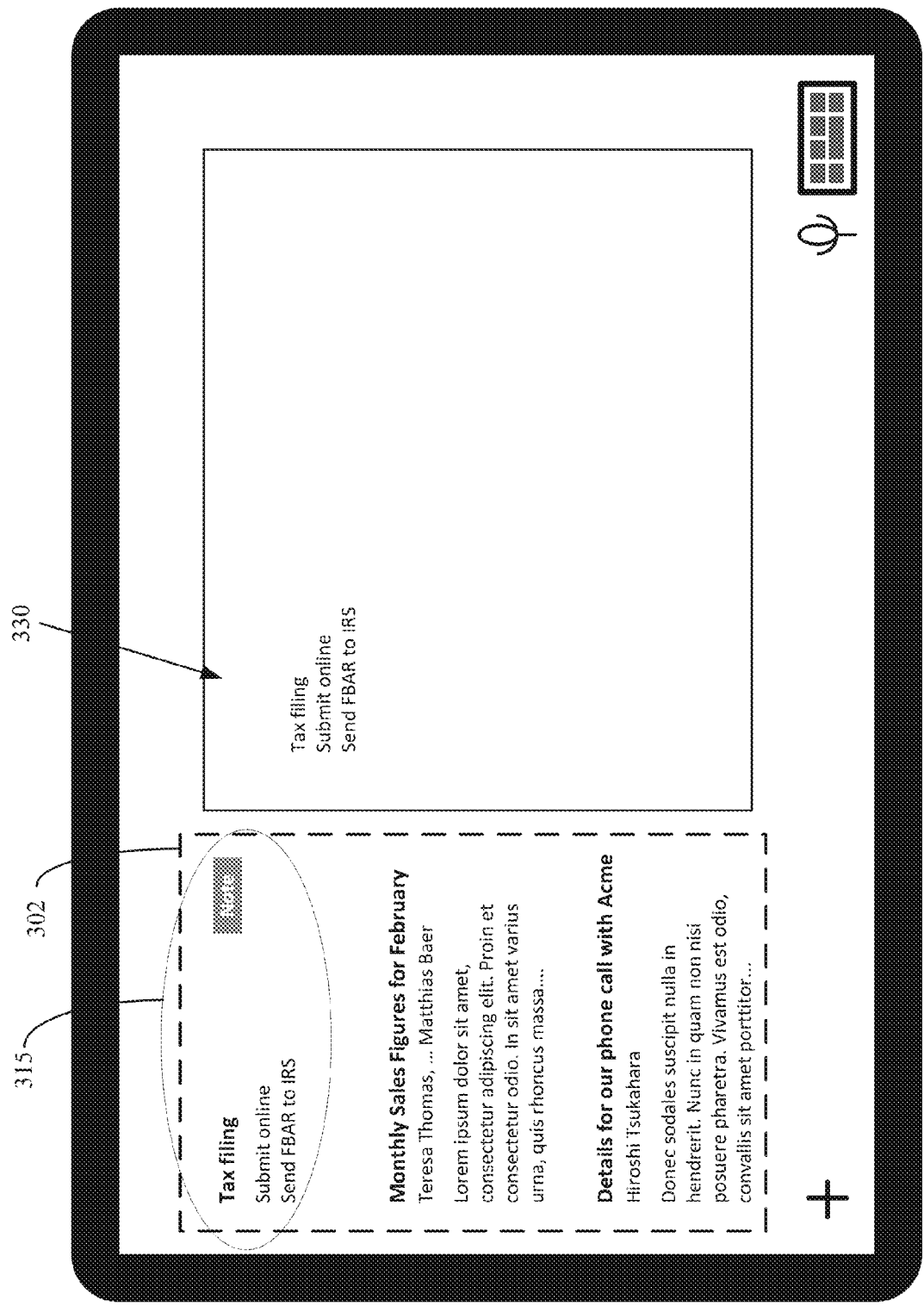

FIGS. 3A-3C illustrate an example scenario of generating a draft item in an information management application involving an email application.

In the example scenario of FIGS. 3A-3C, the new draft item depicted is a simple "note" type that serves as a virtual version of a paper sticky note.

Returning briefly to FIG. 2B, a user entering text directly from a keyboard may enter a state for creating a new draft item such as shown in FIG. 3A. As illustrated in FIG. 3A, a draft item composition interface 300 may surface in an email application interface in response to receiving input from a user, for example via a keyboard 301 or other input device. In some cases, a list 302 or some particular view of the primary work queue may also be viewable while the draft item composition interface 300 is being displayed on the user's device 310.

As a user types on the (touchscreen) keyboard 301 while within the composition interface 300, the typed text 311 provides the content for a new draft item. In some cases where a list 302 is displayed with the draft item composition interface 300, the text 311 is reflected in a composition surface 312 of the composition interface 300 and at least some of the text 311 is displayed as a new item 315 in the list 302.

At this point, the system may be agnostic as to the type of item being entered into the new draft item interface. In some implementations, traditional email message information fields may be available through the interface, as shown by elements for entering a subject line (subject field 316) and one or more message recipients (recipient field 317). However, these information fields may be omitted and/or other fields may be included depending on the implementation. In some cases, the system can determine whether certain input fields should be included in the composition interface 300 and/or automatically populate certain fields of a new item (e.g., item 315) depending on the content (text and/or images) input to the composition surface 312.

FIG. 3B illustrates a state in which a user has entered content 321 to the composition surface 312. When no subject text is entered into a subject field 316 (or if no such field is present, the first line of the content area may be interpreted by the system as the "title" or "subject" 322 for the new item 315. Some or all of the remaining content 321-B may be shown in the message list 302.

In the example illustrated in FIG. 3B, a "note" item type indicator 323 is shown on the item 315 in the message list 302. An item type indicator may be used to provide additional information to the user about the content of an item once it becomes listed in the application's primary work queue. The determination that the new draft item 315 is a note item type may be made by the system based on a number of factors such as, but not limited to, the content, the use of or lack of a subject, recipient and/or other input field of the composition interface 300, explicit indicators in the content for an item type (e.g., "to-do", "schedule meeting"), and/or selection (e.g., via menu options) for the item type.

In some embodiments, natural language processing may be used to discern item types through interpretation of the text typed in the content area of the new draft item. This reduces the need for item type selectors or other interface elements that may make interacting with the new draft item more cumbersome for the user. In the example in FIG. 3B, no user action was required to tag the item type as a "note." Instead, the system discerned that the content of the new draft item, which contains several lines of text and no specific action verb in the first line, was most likely a "note" type and not a to-do list item, calendar item, or other item type.

It should be understood that the item-type associated with a new draft item may be changed—either automatically by the system when the user changes content within the draft or in response to a user selection of a particular item-type. The item-type may be adjusted, in some cases, at any time. For example, a draft item of "Ask Ben about the prototype" may be initially indicated as a note or a to-do item depending on how the application discerns the draft (and/or what the user may initially select as the item-type of the new draft item). The user may at some time edit the draft item in a manner that the draft item is morphed into a message that can be sent to Ben, for example by the user including a recipient contact for Ben.

FIG. 3C shows a state of the interface after the new draft item is entered. For example, just prior to the view in FIG. 3C, the user may have clicked away from the content entry area of the new draft item, closed the keyboard, indicated a device-specific "back" command, selected "enter" on a keyboard, or performed another action indicating completion of, saving of or exiting from the new draft item. In FIG. 3C, the new note 315 is depicted in the inbox or primary work queue and a preview/full view of the new draft item 330 can be shown. In some cases, the content of the new draft item 330 appears without modification from how it was entered. In some cases, formatting and/or additional features may be added by the system based on the item type and/or other aspects related to the content of the item. For example, a to-do list may have system-generated check boxes and a note may have a system-generated title (which may text taken from the content or created based on the content).

FIGS. 4A-4E illustrate another example scenario of generating a draft item in an information management application involving an email application.

Figure 4A:
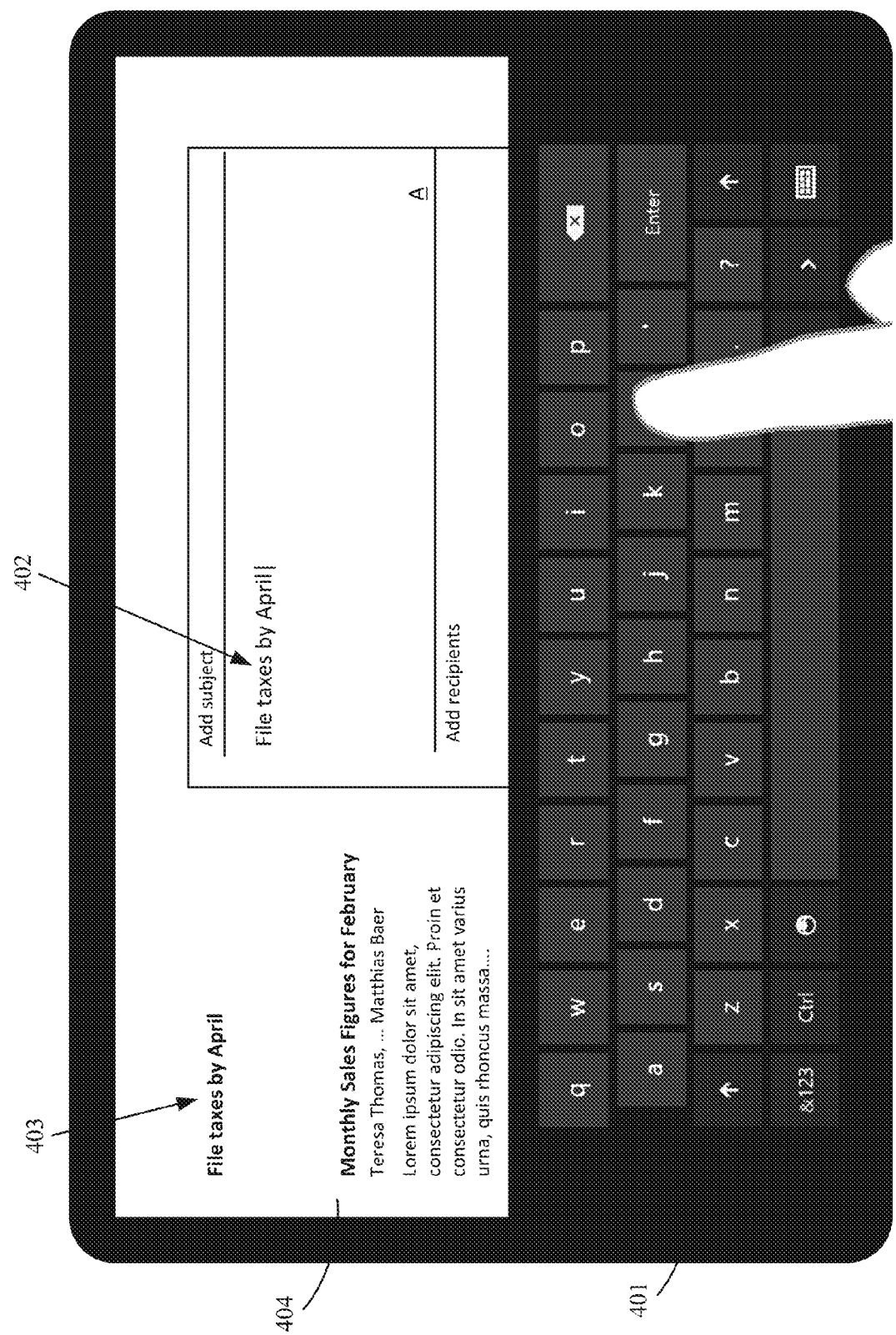
FIGS. 4A-4E illustrate another example scenario of generating a draft item in an information management application involving an email application.

In the example in the series of FIGS. 4A-4E, the new draft item is determined by the system to be a "to-do" item type. Starting with FIG. 4A, the user may have already indicated the intent to begin typing a new draft item, for example, in a manner described with respect to FIG. 2A. FIG. 4A shows the user beginning to enter a new draft item to serve as a "to-do" list item with a specific due date, in this case an item to remind her to file her taxes by April 15. As has been depicted in prior examples, but not intended to be limiting, entering text via keyboard 401 into the content area 402 of the new draft item may simultaneously display the text in the item view 403 in the primary work queue view 404.

Figure 4B:
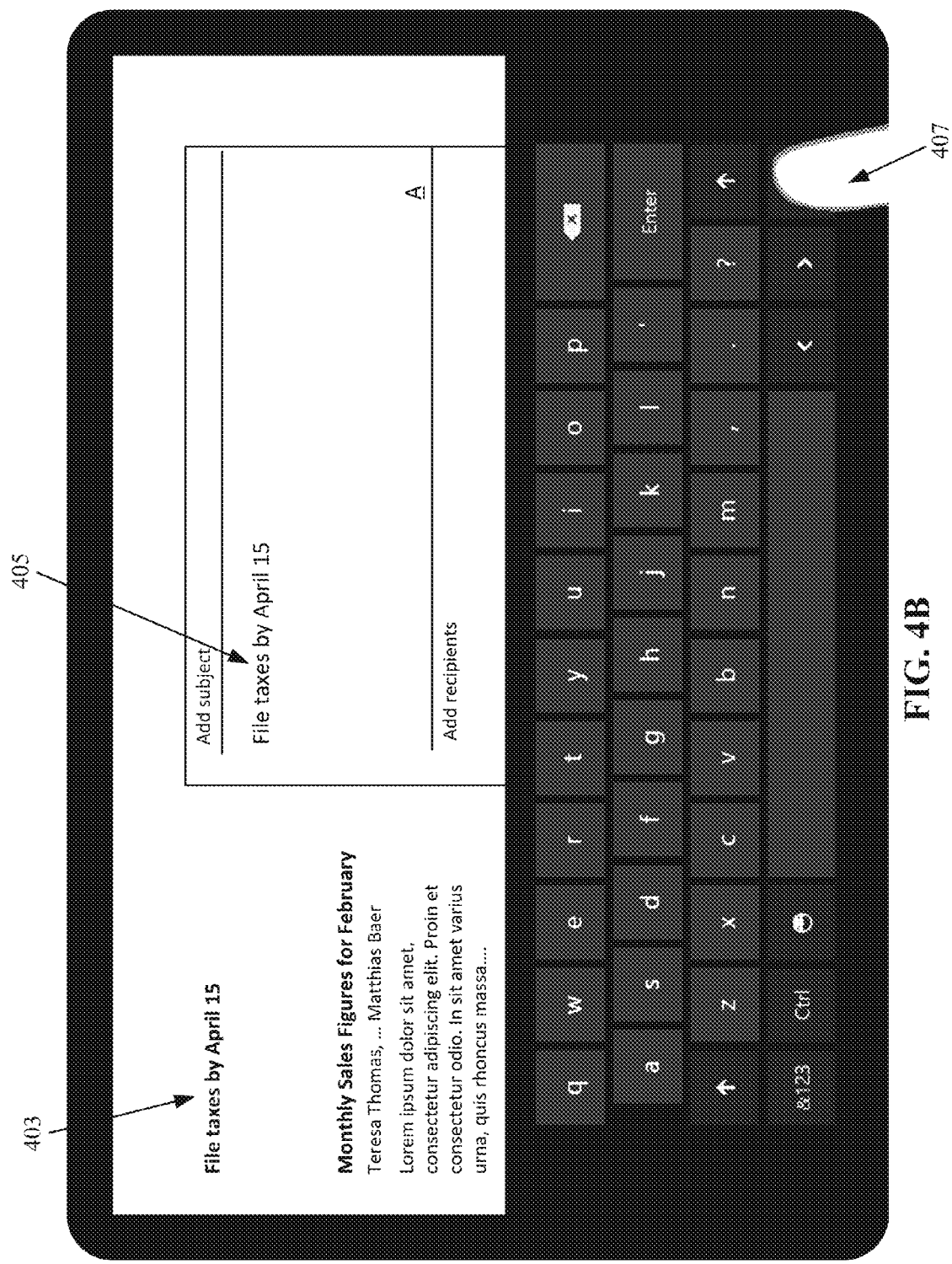

Continuing on to FIG. 4B, the user's entry of the content 405 for the new draft item has been completed. The content 405 for the new draft item may be reflected both in the content area 402 and in the item view 403 in the primary work queue. After completing her typing, the user may indicate that the entry process is finished (e.g., with selection 407 to close the keyboard).

Figure 4C:
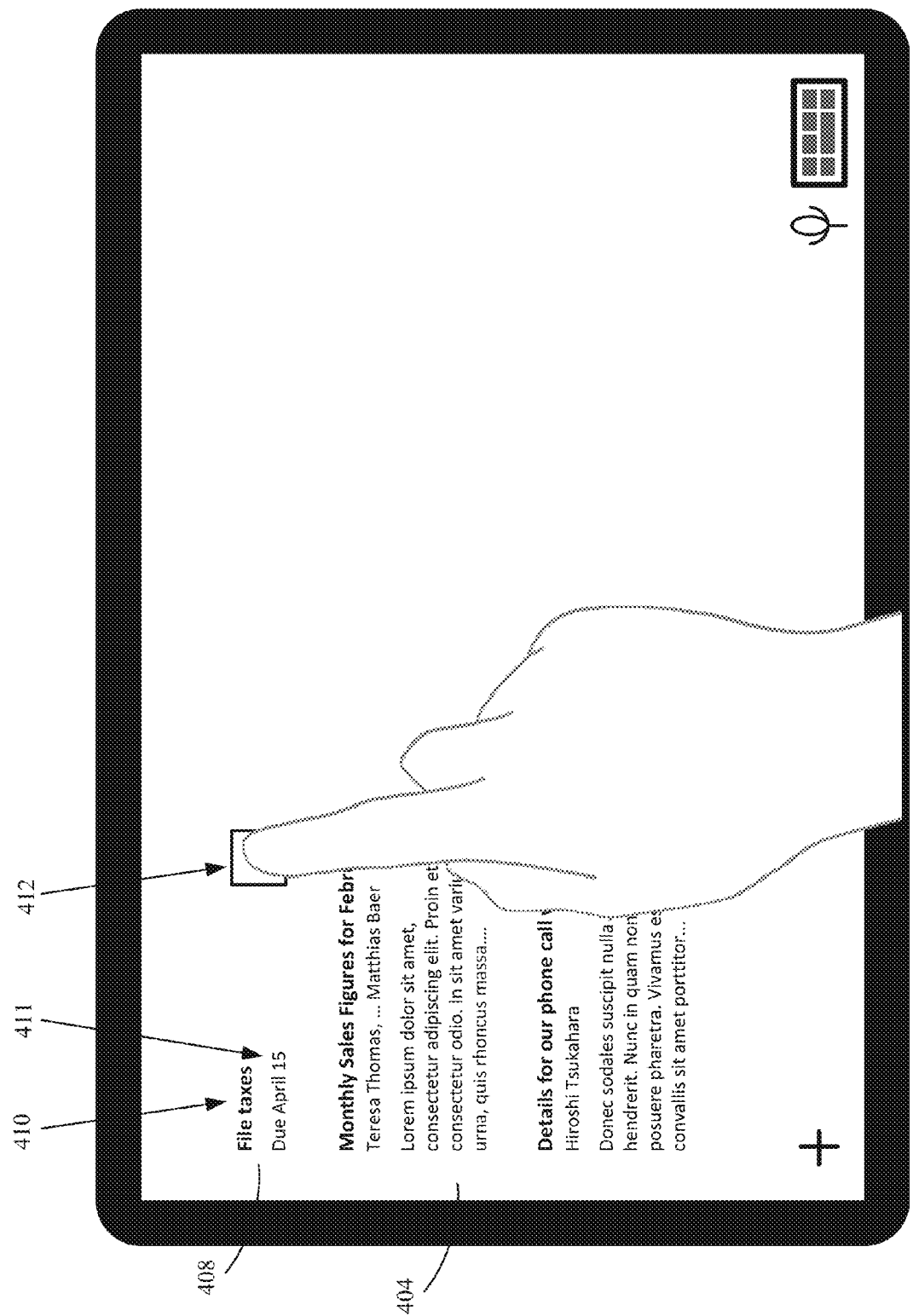

In FIG. 4C, since the system determined that the new item was a to-do item upon the user completing her typing, the item view may surface as a new to-do list item 408 in the primary work queue view 404.

The system may have discerned the new draft item type from the natural language text typed into the new draft item's content area. The user's intent to make this a to-do list item with an attached reminder may have been discerned by at least two factors in the example. First, the first line of the new draft item content includes an action verb, which indicates a task to be completed as opposed to the notes or other descriptive information shown in the series of figures in 3A-3C. Second, the new draft item contains content indicating a "by April 15" which is easily discernible to a natural language processor as an indication of a due date.

Rather than merely show the new to-do list item view 408 in the primary work queue view 409 exactly as written, the example embodiment depicts the to-do list item view in a modified or summarized form to enhance user interaction with the to-do list item. These enhanced user interactions may be desirable aspects of the disclosed techniques when the primary work queue contains a multiplicity of item types, e.g., notes, messages, to-do list items, etc. It should be noted that other methods of depicting a to-do list item, with or without a due date, are possible and this example embodiment is but one view.

To-do list item view 408 shows several such enhancements. First, the new to-do list item view shown is a modification of the user's original entered text. The title or subject of the item 410, shown in bold, has been shortened to reflect the direct action of the to-do task ("File taxes"). Second, the due date for the task 411 has been moved to the line below the subject, where the due date can be more clearly displayed. Third, unlike traditional draft emails, the new to-do list item view does not have a sender and recipient line indication which is not relevant to the item type.

Fourth, in some embodiments—those where a messaging application has features for reminder notification—the due date for the task may be recorded in the reminder notification system such that the user is notified that the to-do task is upcoming, due, or late.

Fifth, the example embodiment depicts the to-do list item view as having a "check box" 412 user interface element that the user may click or press to indicate completion of the described task. In the figure, the user is shown as readying to indicate completion of the task with a finger-press.

Figure 4D:
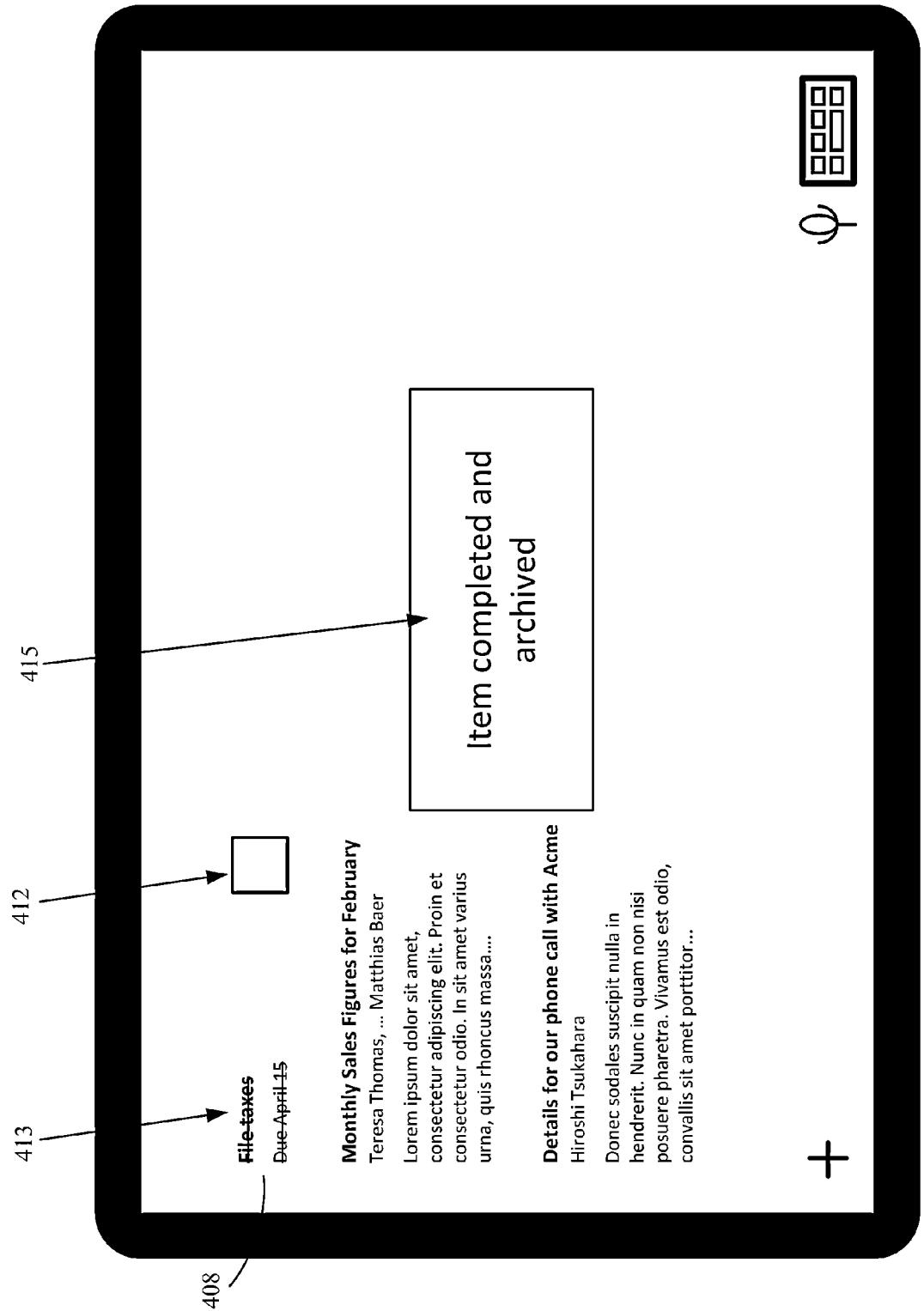

FIG. 4D shows an example embodiment in which the application depicts a completed to-do list item with further enhancements. In FIG. 4D, the completed to-do list item view 408 is rendered in strikethrough text 413 and the checkbox 412 is now darkened. In the center of the application interface, an action notification element 415 surfaces to inform the user that the item has been "completed and archived." It should be noted that the use of strikethrough text and an action notification element are merely examples and are not intended to be limiting. For example, in some embodiments, completed to-do list item may disappear from primary work queue when checked.

Figure 4E:
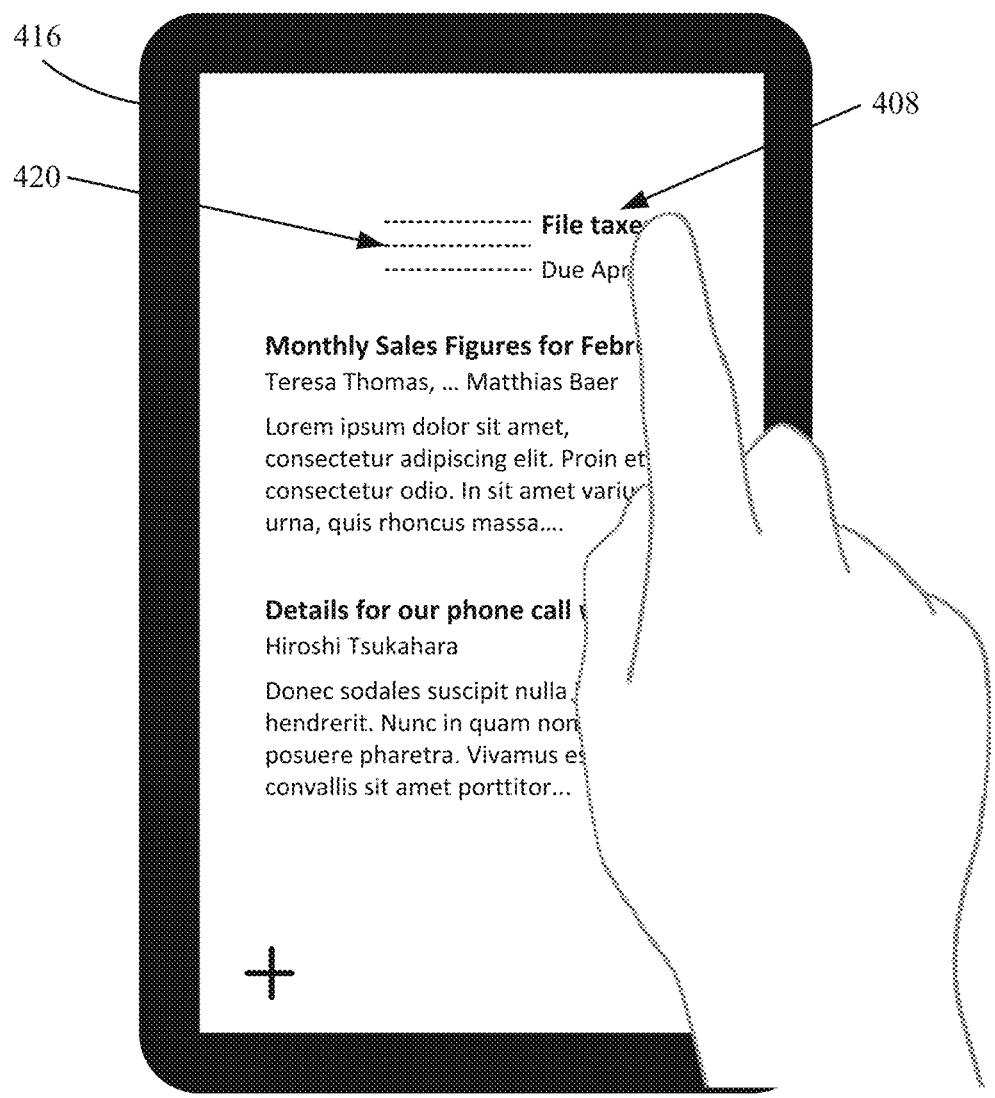

FIG. 4E shows another implementation of marking the item as complete that may be available in some computing environments or devices. In FIG. 4E, a smaller touchscreen device 416, like a smartphone, is shown. A contextual menu may be available for a user to operate on an item in the primary work queue (or any other list of items) and/or designated gestures that initiate certain commands may be available (for touch devices) for a user to perform. In this example, the user is shown using a press and drag gesture, or "swiping gesture" 420 (action lines are shown to indicate the motion of the item) to slide the completed to-do list item 408 toward the edge of the screen. In this illustrative example, the application may interpret this swiping gesture as indicating a command for marking the to-do list item as being completed. Of course, other gestures may be specified for marking a to-do list item as being completed—depending on the application, operating system and/or device constraints.

As mentioned above, users may take action on individual items from the primary work queue. According to certain embodiments, the resulting action from a particular gesture and/or the available menu commands can specifically depend on the item type. Examples of actions include, but are not limited to, replying to a message, commenting, archiving, saving or assigning a date to the item, and deleting the item. Since an application's primary work queue may show a plurality of item types by implementing the proposed techniques, the application may interpret received input according to the context of the type of item being acted upon and/or present menus with available commands specific to a particular item type. In some cases, specific "triage" options (e.g., delete, flag/mark complete, move, mark as unread/mark as read, categorize, share, and the like) may be available for an item in the primary work queue based on the identified item type.

For example, sliding a to-do list item off the border of the screen, as shown in FIG. 4E may mark the to-do list item as a completed task in much the same manner as clicking the checkbox did in FIG. 4C. For an item identified as a "note" (e.g., as shown in FIGS. 3A-3C), the same gesture may be associated with sharing the note with others; and for a traditional message item type, the swiping motion may indicate deletion or archiving.

Many people today utilize social media applications as much as, or even more than, they use traditional e-mail applications; for those users the ability to create reminders, notes, to-dos and other new draft item types and view them in their social media application's primary work queue may be a benefit. FIGS. 5A-5D illustrate an example scenario of generating a draft item in an information management application involving a social media application. Although a "new events" queue is specifically described, other types of primary work queues are contemplated (e.g., home view, news view, status view, message view, post view, and the like).

Figure 5B:
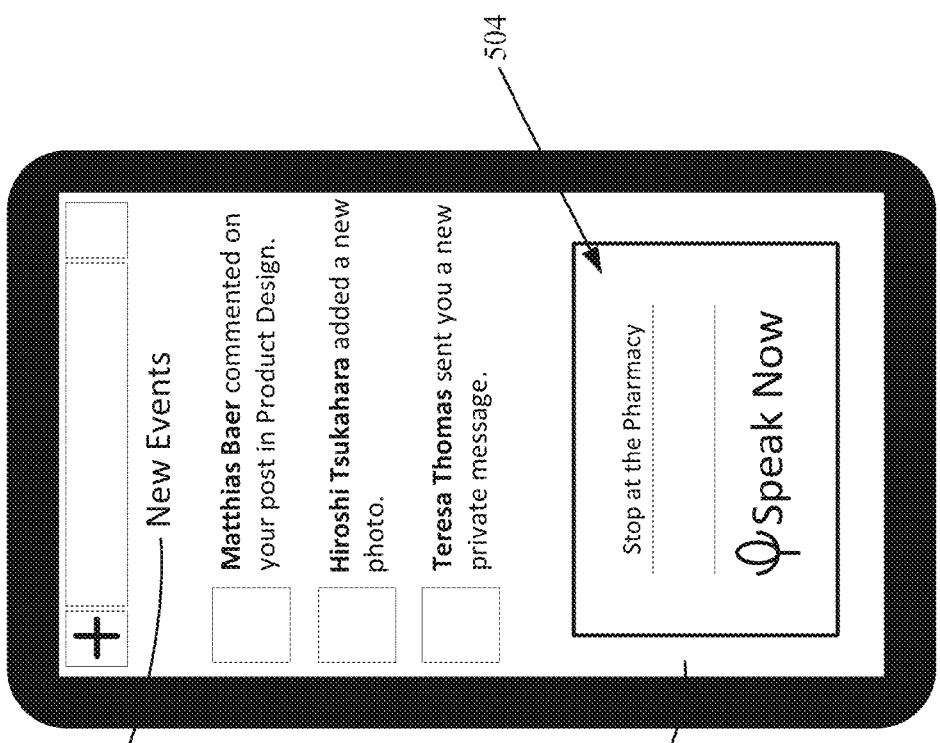
FIGS. 5A-5D illustrate an example scenario of generating a draft item in an information management application involving a social media application.
Figure 5A:
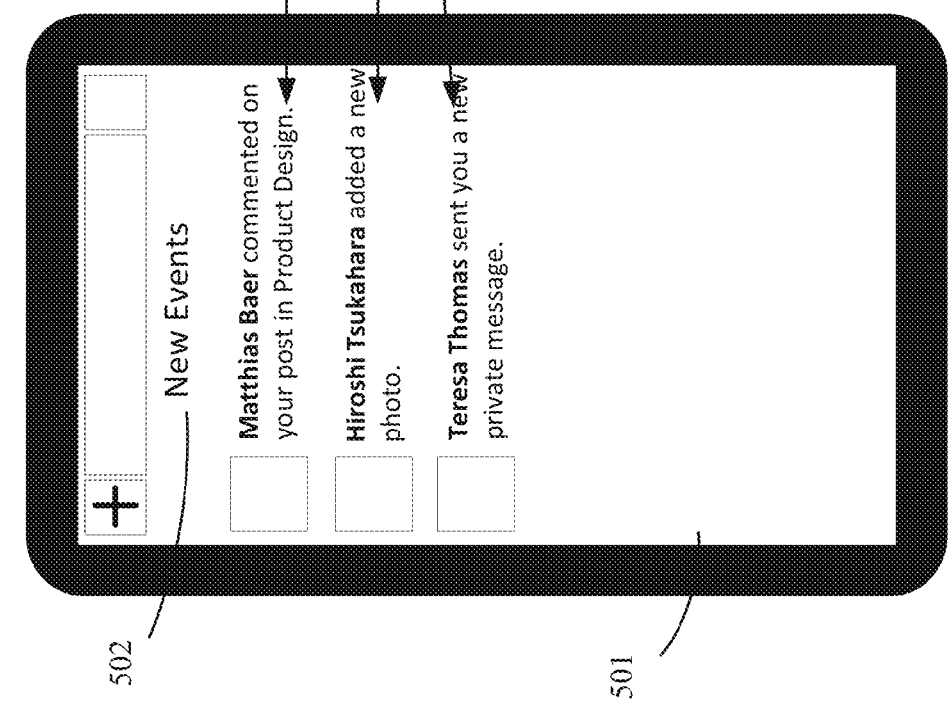

In FIG. 5A, a social media application 501 may have, as a user's primary work queue, a new events queue 502 for providing a centralized view of the diverse happenings in a user's social media interactions. The new events queue 502 may serve to direct the user to particular postings, comments and messages to which to read/review and respond. In the new events queue 502, several notifications of social media-related comments (comment notification 503-A), postings (new photo notification 503-B), and messages (message notification 503-C) are depicted.

FIG. 5B shows the social media application 501 having an overlaid voice command input interface 504. The voice command input interface interaction may be triggered while the user is viewing the new events queue 502 via touch or voice-activated detection word, as discussed above with respect to FIG. 2C. In this example, the user has spoken the words "stop at the pharmacy," which was detected by the device and interpreted via speech-to-text processing to be shown in the voice command input interface 504.

Figure 5D:
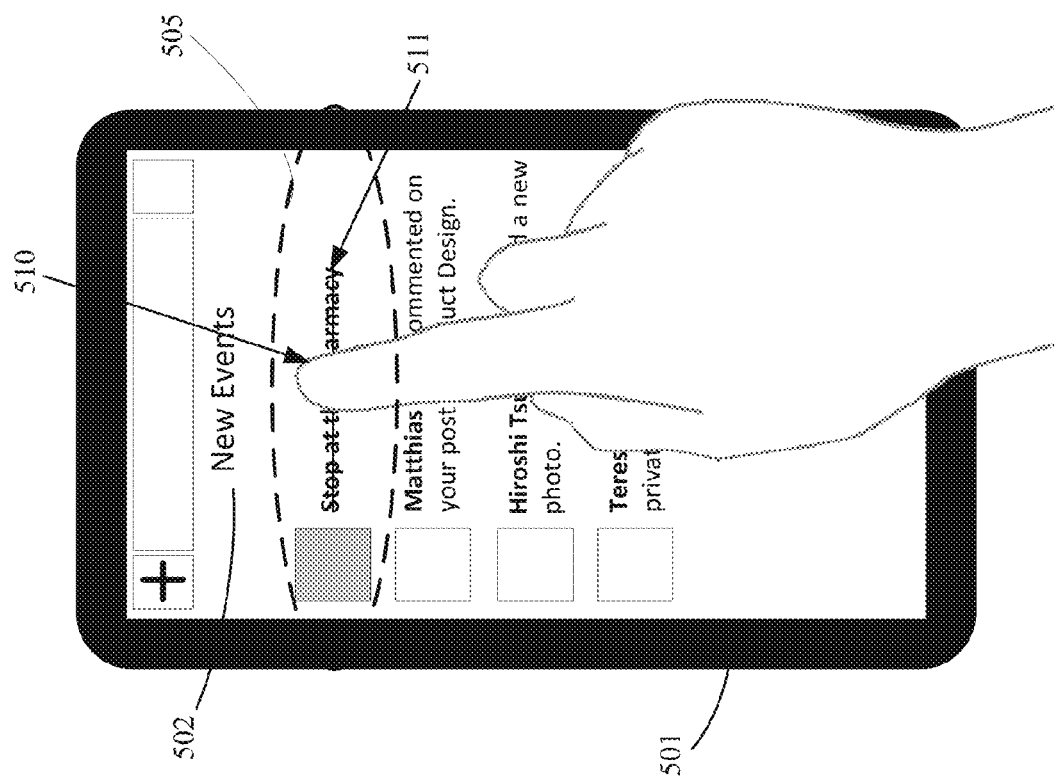
Figure 5C:
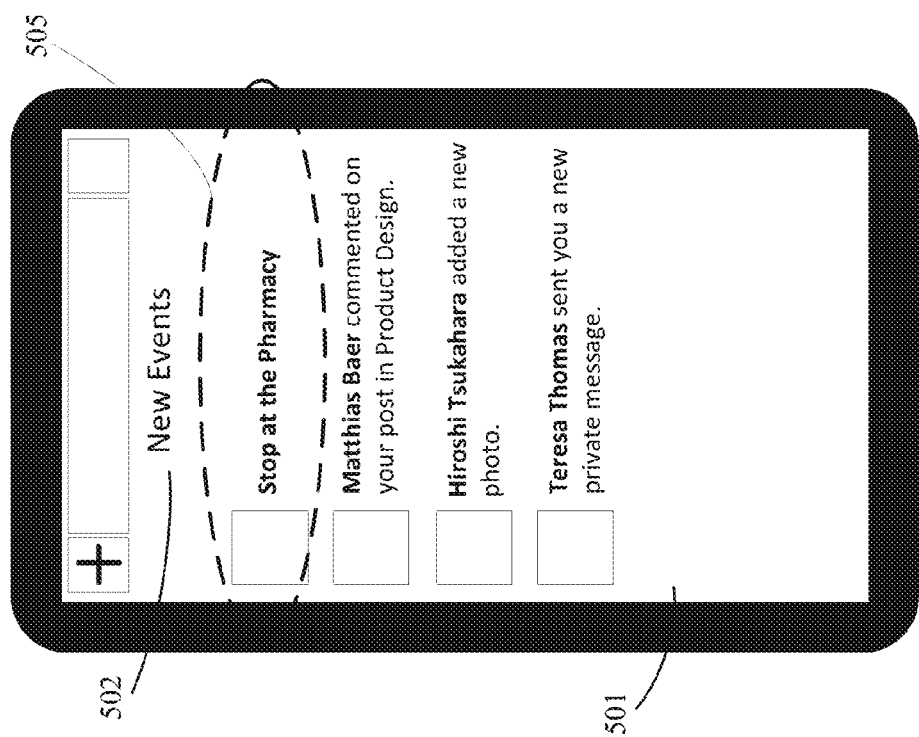

Once the content for the new draft item has been entered by the user, the new draft item 505 can surface in the primary work queue 502 of the social media application 501, such as illustrated in FIG. 5C. In some cases, the application can assign an item type to the new draft item. The item type may be a default type, a user specified type, or may be based at least in part on an analysis of the content of the new draft item.

In the example scenario, the social media application may enable a user to jump to the comment or post referenced in the new event list. For the draft items, the social media application may enable certain actions to be made upon those items. In some cases, a user may indicate that a task has been completed by performing a designated gesture (e.g., touch, tap, double tap, swipe, or other gesture). For example, as shown in FIG. 5D, a user may select (510) a draft item 505 to indicate that the task has been completed. The selecting (510) of the draft item 505 may remove the item from the list or, as in the example shown in FIG. 5D, show the text as strikethrough (511).

Figure 6:
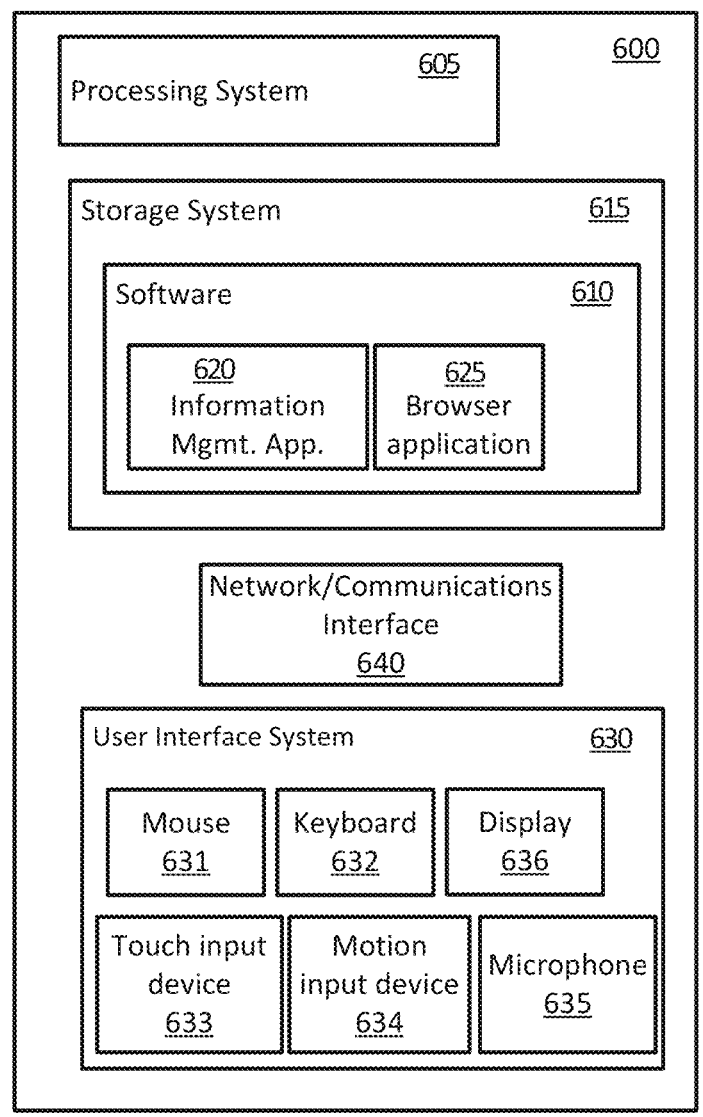
FIG. 6 shows a block diagram illustrating components of a system used in some embodiments.

FIG. 6 shows a block diagram illustrating components of a system used in some embodiments. System 600 may be implemented within a single computing device or distributed across multiple computing devices or sub-systems that cooperate in executing program instructions. System 600 can be used to implement myriad computing devices, including but not limited to a personal computer, a tablet computer, a reader, a mobile device, a personal digital assistant, a wearable computer, a smartphone, a laptop computer (notebook or netbook), a gaming device or console, a desktop computer, or a smart television. Accordingly, more or fewer elements described with respect to system 600 may be incorporated to implement a particular computing device.

System 600, for example, includes a processing system 605 of one or more processors which process data according to the instructions of software 610 stored on a storage system 615. Examples of processors of the processing system 605 include general purpose central processing units, application specific processors, and logic devices, as well as any other type of processing device, combinations, or variations thereof.

The software 610 can include an operating system and application programs such as an information management application 620 and/or web browser application 625. Device operating systems generally control and coordinate the functions of the various components in the computing device, providing an easier way for applications to connect with lower level interfaces like the networking interface. Non-limiting examples of operating systems include Windows® from Microsoft Corp., Apple® iOS™ from Apple, Inc., Android® OS from Google, Inc., and the Ubuntu variety of the Linux OS from Canonical.

It should be noted that the operating system may be implemented both natively on the computing device and on software virtualization layers running atop the native Device operating system (OS). Virtualized OS layers, while not depicted in FIG. 6, can be thought of as additional, nested groupings within the operating system space, each containing an OS, application programs, and APIs.

Storage system 615 may include any computer readable storage media readable by the processing system 605 and capable of storing software 610 including the information management application 620 and/or web browser application 625.

Storage system 615 may include volatile and nonvolatile, removable and non-removable media implemented in any method or technology for storage of information, such as computer readable instructions, data structures, program modules, or other data. Examples of storage media include random access memory, read only memory, magnetic disks, optical disks, CDs, DVDs, flash memory, virtual memory and non-virtual memory, magnetic cassettes, magnetic tape, magnetic disk storage or other magnetic storage devices, or any other suitable storage media. In no case is the storage medium a propagated signal or carrier wave.

In addition to storage media, in some implementations storage system 615 may also include communication media over which software may be communicated internally or externally. Storage system 615 may be implemented as a single storage device but may also be implemented across multiple storage devices or sub-systems co-located or distributed relative to each other. Storage system 615 may include additional elements, such as a controller, capable of communicating with processing system 605.

Software 610 may be implemented in program instructions and among other functions may, when executed by system 600 in general or processing system 605 in particular, direct system 600 or the one or more processors of processing system 605 to operate as described herein for facilitating quick drafts for an information management application (whether it is a traditional information management application, it is primarily an email application, or it is or includes a social media application).

In general, software may, when loaded into processing system 605 and executed, transform computing system 600 overall from a general-purpose computing system into a special-purpose computing system customized to implement quick new draft item entry and integrate primary work queue presentation as described herein. Indeed, encoding software on storage system 615 may transform the physical structure of storage system 615. The specific transformation of the physical structure may depend on various factors in different implementations of this description. Examples of such factors may include, but are not limited to the technology used to implement the storage media of storage system 615 and whether the computer-storage media are characterized as primary or secondary storage.

The system can further include user interface system 630, which may include input/output (I/O) devices and components that enable communication between a user and the system 600. User interface system 630 can include input devices such as a mouse 631, track pad (not shown), keyboard 632, a touch device 633 for receiving a touch gesture from a user, a motion input device 634 for detecting non-touch gestures and other motions by a user, a microphone for detecting speech 635, and other types of input devices and their associated processing elements capable of receiving user input.

The user interface system 630 may also include output devices such as display screens 636, speakers (not shown), haptic devices for tactile feedback (not shown), and other types of output devices. In certain cases, the input and output devices may be combined in a single device, such as a touchscreen display which both depicts images and receives touch gesture input from the user. Visual output may be depicted on the display 636 in myriad ways, presenting graphical user interface elements, text, images, video, notifications, virtual buttons, virtual keyboards, or any other type of information capable of being depicted in visual form.

The user interface system 630 may also include user interface software and associated software (e.g., for graphics chips and input devices) executed by the OS in support of the various user input and output devices. The associated software assists the OS in communicating user interface hardware events to application programs using defined mechanisms. The user interface system 630 including user interface software may support a graphical user interface, a natural user interface, or any other type of user interface. For example, the composition interface (134-A, 300) and voice command input interface (220) described herein may be presented through user interface system 630.

Communications interface 640 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

It should be noted that many elements of system 600 may be included in a system-on-a-chip (SoC) device. These elements may include, but are not limited to, the processing system 605, a communications interface 640, and even elements of the storage system 615.

It should be understood that computing system 600 is generally intended to represent a computing system with which software is deployed and executed in order to implement an application with the methods for entering quick new draft items and integrating the items' presentation in the primary work queue, as described herein. However, computing system 600 may also represent any computing system on which software may be staged and from where software may be distributed, transported, downloaded, or otherwise provided to yet another computing system for deployment and execution, or yet additional distribution.

It should be understood that the examples and embodiments described herein are for illustrative purposes only and that various modifications or changes in light thereof will be suggested to persons skilled in the art and are to be included within the spirit and purview of this application.

What is claimed is:

1. A method of operating information management applications, the method comprising:
    receiving a new item request through a user interface to an information management application executed on a computing device;
    displaying, at a screen of the computing device, a primary work queue of the information management application, wherein the primary work queue comprises a list of item types that can be sorted by date and time;
    initiating, at the computing device, a new draft item in response to the new item request, wherein the initiating the new draft item includes providing a graphical user interface for composing the new draft item;
    determining an item type of the new draft item;
    providing at least one item-specific functionality for the new draft item based on the item type of the new draft item; and
    upon creating the new draft item, surfacing, at the screen of the computing device, a view of the new draft item at the top of the list of item types that can be sorted by date and time in the primary work queue of the information management application.

2. The method of claim 1, wherein the primary work queue comprises at least two item types.

3. The method of claim 1, wherein the view comprises an item-type view based on the item type of the new draft item.

4. The method of claim 1, wherein:
    the information management application comprises an email application, and the primary work queue comprises an inbox of the email application.

5. The method of claim 1, wherein the information management application comprises a social media application.

6. The method of claim 1, further comprising identifying content within the new draft item to automatically populate at least one metadata associated with the new draft item.

7. The method of claim 1, wherein the new item request comprises an indication of a paste command within the primary work queue.

8. The method of claim 1, wherein the new item request comprises an indication of a selection of a new item command.

9. The method of claim 1, further comprising initiating the new draft item while maintaining the display of the primary work queue.

10. The method of claim 1, wherein the surfacing the view is performed without requiring a network connection for sending and receiving a message.

11. The method of claim 1, wherein the screen is a touchscreen.

12. An apparatus comprising:
    one or more computer readable storage media;
    one or more hardware processors; and
    an information management application embodied in program instructions stored on the one or more computer readable media that, when executed by the one or more hardware processors, direct the one or more hardware processors to perform:
    receiving a new item request through a user interface to an information management application executed on a computing device;
    displaying, at a screen of the computing device, a primary work queue of the information management application, wherein the primary work queue comprises a list of item types that can be sorted by date and time;
    initiating, at the computing device, a new draft item in response to the new item request, wherein the initiating the new draft item includes providing a graphical user interface for composing the new draft item;
    determining an item type of the new draft item;
    providing at least one item-specific functionality for the new draft item based the item type of the new draft item; and
    upon creating the new draft item, surfacing, at the screen of the computing device, a view of the new draft item at the top of the list of item types that can be sorted by date and time in the primary work queue of the information management application.

13. The apparatus of claim 12, wherein the primary work queue comprises at least two item types.

14. The apparatus of claim 12, wherein the view comprises an item-type view based on the item type of the new draft item.

15. The apparatus of claim 12, wherein the information management application comprises an email application.

16. The apparatus of claim 12, wherein the screen is a touchscreen.

* * * * *